United States Patent [19]

Utsumi et al.

[11] Patent Number: 5,366,783

[45] Date of Patent: * Nov. 22, 1994

[54] LAMINATED POLYESTER FILM FOR MAGNETIC TAPE HAVING SPECIFIC SURFACE PROPERTIES

[75] Inventors: Shigeo Utsumi; Masashi Inagaki, both of Kanagawa; Yuko Watanuki, Tokyo, all of Japan

[73] Assignee: Diafoil Hoechst Company, Limited, Tokyo, Japan

[*] Notice: The portion of the term of this patent subsequent to Mar. 5, 2009 has been disclaimed.

[21] Appl. No.: 845,427

[22] Filed: Mar. 5, 1992

[30] Foreign Application Priority Data

Mar. 8, 1991 [JP] Japan ................. 3-043710

[51] Int. Cl.$^5$ ........................... B32B 5/16; D06N 7/04
[52] U.S. Cl. .................................. 428/141; 428/143; 428/323; 428/480; 428/694 SG
[58] Field of Search ............. 428/323, 480, 694, 900, 428/694 BR, 694 ST, 694 SG, 141, 143

[56] References Cited

U.S. PATENT DOCUMENTS

| | | | |
|---|---|---|---|
| 4,687,700 | 8/1987 | Hensel et al. | 428/213 |
| 4,720,412 | 1/1988 | Katoh et al. | 428/141 |
| 4,789,759 | 1/1989 | Dallman et al. | 428/220 |
| 4,804,736 | 2/1989 | Utsumi | 528/176 |
| 5,047,278 | 9/1991 | Ono et al. | 428/141 |
| 5,069,962 | 12/1991 | Okazaki et al. | 428/323 |

FOREIGN PATENT DOCUMENTS 0158960 10/1985 European Pat. Off. .
0238985 9/1987 European Pat. Off. .

*Primary Examiner*—Paul J. Thibodeau
*Assistant Examiner*—H. Thi Lê
*Attorney, Agent, or Firm*—Foley & Lardner

[57] ABSTRACT

A polyester film prepared through a lamination of at least two layers by coextrusion, wherein one of exposed surfaces (surface A) has a center line average roughness of from 0.002 to 0.015 μm, a polyester layer forming the other of the exposed surfaces (surface B) has a lower melting point than a polyester forming the surface A, and the surface B has a degree of planar orientation of not larger than 0.100, which can be used as a base film for magnetic recording tape having no back coating.

18 Claims, No Drawings

LAMINATED POLYESTER FILM FOR MAGNETIC TAPE HAVING SPECIFIC SURFACE PROPERTIES

BACKGROUND OF THE INVENTION

1. Field of the Invention

The present invention relates to a polyester film for a magnetic tape, more particularly to a polyester film suitable for a nonback-coated magnetic recording tape.

2. Description of Related Art

Since video players are quickly widespread, video tapes are increasingly consumed and their prices are decreased. The consumers seek an inexpensive and high-quality tape giving high image quality.

In order to achieve the high image quality, smoothness of a magnetic layer surface is generally increased. To this end, it is necessary to use a smooth base film. But, the smooth base film give a bad traveling property. The traveling property can be improved by providing a back coating layer. Since the back coating layer increases the production cost of the tape, it is sought to improve the traveling property without providing the back coating layer.

Instead of providing the back coating layer, it is proposed to use a base film which has opposite surfaces having different sliding properties and in which one surface for receiving a magnetic layer is smooth and the other is rough. But, this film can not be employed since the rough surface makes the magnetic layer surface rough, namely "roughness transcription" phenomenon arises. Although it is proposed to suppress the "roughness transcription" phenomenon by improving the film which has opposite surfaces having different sliding properties through the increase of an amount of contained particles near the rough surface, this causes new problems that productivity is low and a quality of the magnetic tape is poor due to the drop-off of particles.

SUMMARY OF THE INVENTION

One object of the present invention is provide a polyester film which solves the above problems and is used as a base film for a magnetic tape having no back coating layer.

This and other objects of the present invention are achieved by a polyester film suitable for a magnetic tape and prepared through a lamination of at least two layers by coextrusion, wherein one of exposed surfaces (surface A) has a center line average roughness ($Ra^4$) of from 0.002 to 0.015 µm, a polyester layer forming the other of the exposed surfaces (surface B) has a lower melting point than a polyester forming the surface A, and the surface B has a degree of planar orientation of not larger than 0.100.

DETAILED DESCRIPTION OF THE INVENTION

The polyester (A) forming one of the exposed surfaces of the film according to the present invention may be a polymer prepared through a polycondensation reaction of an aromatic dicarboxylic acid (e.g. terephthalic acid and naphthalene-2,6-dicarboxylic acid) with an aliphatic glycol (e.g. ethylene glycol, diethylene glycol, tetramethylene glycol and neopentyl glycol). Specific examples of the polyester (A) are polyethylene terephthalate (PET) and polyethylene-2,6-naphthalene dicarboxylate (PEN). In addition to a homopolymer, it is possible to use a polymer prepared through a copolymerization with an aromatic or aliphatic dicarboxylic acid or diol in such amount that the crystallinity is not decreased, for example at most 10% by mole, preferably at most 5% by mole. Although it is possible to blend other polymer such as a polyamide, a polyolefin and a polycarbonate in an amount of not larger than 10% by weight, it is not preferable to use a polymer which extremely decreases the crystallinity or extremely roughens the surface after the film preparation.

The polyester (B) forming the other of the exposed surfaces of the film has a lower melting point than the polyester (A). The polyester (B) is preferably a copolymeric polyester. The copolymeric polyester may be a copolymerization product having a base polyester component unit used in the polyester (A) such as an ethylene terephthalate unit and an ethylene-2,6-naphthalate unit with at least one other component unit. The copolymerizable component may be at least one dicarboxylic acid such as oxalic acid, malonic acid, succinic acid, adipic acid, azelaic acid, sebacic acid, 1,10-decane dicarboxylic acid, phthalic acid, isophthalic acid, terephthalic acid, naphthalene dicarboxylic acid and diphenylether dicarboxylic acid; or at least one diol such as neopentyl glycol, 1,4-butane diol, trimethylene glycol, propylene glycol, tetramethylene glycol, hexamethylene glycol, diethylene glycol, polyalkylene glycol and 1,4-cyclohexane dimethanol.

An hydroxycarboxylic acid such as p-hydroxybenzoic acid and p-hydroxyethoxybenzoic acid; a monofunctional compound such as benzoic acid, benzoylbenzoic acid and methoxypolyalkylene glycol; and a polyfunctional compound such as glycerol and pentaerythritol can be used so long as the product has a substantially straight chain.

A total amount (T+W) of a content [T (% by mole)] of the copolymerizable component other than the main component of the polyester (A) in the total amount of carboxylic acids in the polyester layer (B) and a content [W (% by mole)] of the copolymerizable component other than the main component of the polyester (A) in the total amount of diol components in the polyester layer (B) is usually from 6 to 40% by mole, preferably from 10 to 40% by mole. When the amount of the copolymerizable components is smaller than 6% by mole, abrasion resistance after the film formation is poor. When the amount is larger than 40% by mole, the film formation is difficult.

The polyester used in the present invention may usually contain fine particles such as an organic lubricant and inorganic lubricant. If necessary, an additive such as a stabilizer, a pigment, an antioxidant, an antifoamer and an antistatic agent may be added. Specific examples of the fine particles giving a sliding property are inert external particles such as kaolin, clay, calcium carbonate, silicon oxide, spherical silica, calcium terephthalate, aluminum oxide, titanium oxide, calcium phosphate, lithium fluoride and carbon black; and internal particles which are formed in the polymer during the polymerization by a high melting point organic compound which is not molten during the film melt preparation of the polyester resin, a cross-linked polymer and a metal compound catalyst (for example, an alkaline metal compound and an alkaline earth metal compound) used during the polyester preparation.

The center line average roughness ($Ra^4$) of the surface of the polyester layer (A) is usually from 0.002 to 0.015 µm, preferably from 0.003 to 0.011 µm, more preferably from 0.004 to 0.009 µm. In order to make such surface state, usually, the layer (A) contains inert particles having an average particle size of from 0.007 to 2.0 μm in an amount of 0.001 to 0.50% by weight. The inert particles may be a single kind and, if necessary, at least two kinds of particles may be used to give bimodal system. An average particle size of the used inert particles is preferably from 0.02 to 1.5 μm, their added amount is preferably from 0.1 to 0.40% by weight.

The polyester layer (B) usually contains inert particles having an average particle size of 0.007 to 10 μm in an amount of not larger than 20% by weight, preferably not larger than 10% by weight, more preferably not larger than 5% by weight. An average particle size of the inert particles is preferably from 0.1 to 2.5 μm, more preferably from 0.1 to 1.0 μm, most preferably 0.1 to 0.5 μm. An amount of the inert particles is preferably from 0.3 to 40% by weight, more preferably 0.5 to 10% by weight, most preferably 1.0 to 5.0% by weight.

An center line average roughness of the surface of the layer (B) is expressed by $Ra^B$, the ten-point average roughness is expressed by $Rz^B$, and a peak count per 0.8 mm is expressed by Pc. The ratio $Rz^B/Ra^B$ is preferably not larger than 15.0, more preferably not larger than 12.0, most preferably not larger than 10.0. The Pc is usually not smaller than 50, preferably not smaller than 70, more preferably not smaller than 80.

A thickness (t) of the polyester layer (B) is usually not larger than 5 μm, preferably from 0.005 to 2 μm, more preferably from 0.01 to 1 μm, most preferably from 0.01 to 0.7 μm. A ratio (t/d) of the thickness (t) of the layer (B) to the average particle size (d) of the inert particles in the layer (B) is preferably from 0.1 to 10, more preferably from 0.2 to 5.0, most preferably from 0.3 to 2.0. When the value of t/d is outside the above range, the rolled form in the rolled product of the film tend to be unsatisfactory.

The degree of planar orientation αP is not larger than 0.100, preferably not larger than 0.050, more preferably not larger than 0.030, most preferably not larger than 0.010. When the αP is larger than 0.100, the film has poor abrasive resistance.

Although the laminate film of the present invention is based on a two layer film consisting of layers (A) and (B), the film of the present invention may have more than two layers.

Although the preparation method of the film according to the present invention is explained in detail, it is not limited to the following method.

The polyester (A) and polyester (B) containing the inorganic particles in a suitable amount are dried using a hopper dryer, a paddle dryer, a vacuum dryer or the like, and then molten at 200° to 320° C. in separate extruders. Then, the polyesters are flowed together in a pipe or a nozzle, extruded in two layers or three layers of two kinds, and quenched to prepare an unstretched film. For extrusion, a conventional method such as a T-die method and a tubular method can be used. By adjusting a flow amount in each extruder, a ratio of the thicknesses in a laminate film can be varied. When the T-die method is used to prepare the unstretched film, a film with a uniform thickness can be obtained by using a so-called electrostatic pinning method. Then, the unstretched film is stretched in longitudinal and transverse directions at a draw ratio of at least 2.0 at a temperature of $(Tg^A-10)$ to $(Tc^A-10)$°C. [$Tg^A$: a glass transition temperature of the polyester (A), $Tc^A$: a crystallization temperature of the polyester (A)]. Then, the film is again successively biaxially stretched at a temperature of from $(Tg^A+10)$ to $(Tm^A-40)$°C. at a longitudinal draw ratio of from 1.05 to 2.5 and a transverse draw ratio of from 1.05 to 2.5 and then heat-set for one second to 10 minutes. The heat set temperature is usually from $(Tm^B-10)$ to $Tm^A$°C., preferably from $Tm^B$ to $Tm^A$°C., more preferably from $(Tm^B+5)$ to $Tm^A$°C. [$Tm^B$: a melting point of the polyester (B)]. When the heat set temperature is higher than $Tm^A$, the film frequently breaks and when the temperature is lower than $(Tm^B-10)$°C., the film easily curls.

The heat set is usually carried out with maintaining the film in the fixed state. The film can be shrunk or tentered in the longitudinal and/or transverse directions of the film in an amount of not larger than 20% during the heat set or during cooling after the heat set.

Before, during or after the stretching steps, a corona discharge treatment can be applied to one or both of the film sides so that the adhesion property of the film to a print layer and the like are improved.

Before, during or after the stretching steps, a coating can be conducted on one or both of film sides so that an adhesion property, an antistatic property, an easy slipperiness and a light shielding property are improved.

The film prepared as stated above is rolled to give a product.

PREFERRED EMBODIMENT OF THE INVENTION

The present invention is illustrated by the following examples which do not limit the present invention.

In the Examples, the properties of the film were measured as follows:

1. Melting Point (Tm)

Using DSC-1 manufactured by Perkin Elmer Corp., an endothermic peak temperature corresponding to crystal melting at a heating rate of 16° C./min was measured and defined as a melting point.

2. Degree of Planar Orientation (αP)

Using Abbe refractometer (manufactured by Atago Kogaku), a maximum value of the refractive index in the film plane ($n_\gamma$), a refractive index in a direction perpendicular to this ($n_\beta$) and a refractive index in a thickness direction ($n_\alpha$) were measured, and then a degree of planar orientation was calculated. The refractive indexes were measured by using the sodium D line at 23° C.

$$\text{Degree of planar orientation} = \frac{(n_\gamma + n_\beta)}{2} - n_\alpha$$

3. Slipperiness (F/Fμd)

Two films each having a size of 15 mm×150 mm were piled up on a smooth glass plate. Then, a rubber plate was placed on the films and a load was applied on the rubber plate so that the films contacted under a pressure of 2 g/cm². A frictional force was measured by sliding one film on the other at a speed of 20 mm/min. A friction coefficient at a sliding distance of 5 mm was defined as a coefficient of dynamic friction (F/Fμd). The following evaluation criteria were used:

F/Fμd ≦ 0.50: Good
0.50 < F/Fμd ≦ 0.60: Fair
0.60 < F/Fμd: Bad

These were measured under condition at 23°±1° C. and 50±5% humidity.

4. Surface Roughness (Ra, Rz)

By the use of a surface roughness tester (SE-3FK manufactured by Kosaku Kenkyusho, Ltd.), the center line average roughness was measured according to JIS B-0601-1976, with necessary modifications. The measuring conditions were the use of a contact needle having a tip radius of 2 μm, 30 mg of probe contact pressure, 0.08 mm of cutoff, and 2.5 mm of a measuring length.

A center line average roughness (Ra) was determined from the cross-sectional curve.

The measurement of the ten-point average roughness (Rz) was performed at 12 points on the film and the remaining 10 values after omitting the largest and smallest values were averaged.

5. Amount of Generated White Powder

White powder adhered to a feed roller in a winding machine for a stretched film was visually observed and evaluated as follows:

Good: No generation of white powder
Fair: Slight generation of white powder
Bad: Much generation of white powder 6. Contamination of Calendering Roller A contamination degree of a roller surface contacting to a base film was evaluated using a five step miniature supercalender. The supercalender was five-step calender consisting of mirror finished metal rollers and polyester composite resin rollers. In each roller, a temperature was fixed at 95° C., a line pressure was fixed at 250 kg/cm and a travel velocity was fixed at 80 m/min. The magnetic tape of 5000 m was repeatedly traveled seven times, and white powder adhered to the resin roller was visually evaluated as follows:

Good: Substantially no adhesion of white powder to the resin roller
Fair: Slight adhesion of white powder
Bad: Apparent adhesion of white powder 7. Properties of Magnetic Tape Formation of magnetic layer (preparation of magnetic tape)

A magnetic layer was coated on a polyester film by a conventional method. Namely, γ-Fe₂O₃ (250 parts by weight), a polyurethane (40 parts by weight), nitrocellulose (15 parts by weight), vinyl chloride/vinyl acetate copolymer (20 parts by weight), lecithin (7 parts by weight), methyl ethyl ketone (250 parts by weight) and butyl acetate (270 parts by weight) were mixed and kneaded for 24 hours in a ball mill, and then a polyisocyanate compound (14 parts by weight) was added to prepare a magnetic paint. The magnetic paint was coated on the film so that a thickness of the dried coating was 6 μm.

A magnetic orientation was conducted by a conventional method before the coating was not fully dried. Then, the coated film was introduced in an oven to dry and cure the coating. The magnetic tape was treated in a supercalender and slit to make a video tape having a width of ½ inch.

The properties of the resultant video tape were evaluated using a video deck (NV-3700 manufactured by Matsushita Electric Industrial Co., Ltd.) at a normal speed.

I. Electromagnetic Conversion Property (VTR head output)

A VTR head output was measured by a synchroscope at a frequency of 4 MHz and then evaluated.

II. The Number of Dropouts

A video tape which recorded signals of 4.4 MHz was reproduced fifty times and then the number of dropouts was counted at 15 μsec–20 dB for about 20 minutes by a dropout counter (manufactured by Ohkura Industry). From the number of dropouts, the evaluation was classified as good or bad.

III. Traveling Property of Magnetic Tape

When the magnetic tape was repeatedly traveled in a deck, the traveling property was evaluated according to the following criteria:

Tape which stops: Bad
Tape which is wound disorderly: Fair
Tape which has no problem: Good

COMPARATIVE EXAMPLES 1, 2 AND 3

(Preparation of Polyester)

Terephthalic acid (87 parts by weight) was esterified with ethylene glycol (42 parts by weight) under an atmospheric pressure at 260° C. in the presence of bis-(β-hydroxyethyl) terephthalate oligomer (100 parts by weight) to prepare a polyester oligomer having an esterification rate of 97%. Then, an ethylene glycol slurry of each of (A) synthetic calcium carbonate particles having an average particle size of 0.7 μm, (B) synthetic calcium carbonate particles having an average particle size of 0.8 μm, (C) $Al_2O_3$ particles having a primary particle size of 0.05 μm, (D) fine silica particles having a primary particle size of 0.12 μm, (E) ion exchange resin particles having an average particle size of 0.4 μm was added in an amount of 1% by weight based on the polyester. Then, ethyl acid phosphate (0.014 part by weight), antimony trioxide (0.022 part by weight) and magnesium acetate (0.086 part by weight) were added to perform a polycondensation reaction so as to prepare a polyester havingan intrinsic viscosity of 0.65 [raw materials (A), (B), (C), (D) and (E)]. The above procedure was repeated to prepare a raw material (F) except that particles were not added.

(Preparation of Film)

The raw materials (A), (C) and (F) were mixed so that an amount of the synthetic calcium carbonate particles was 0.3% by weight and an amount of the $Al_2O_3$ particles was 0.35% by weight in a film. The mixture was dried, extruded at 295° C. by an extruder to prepare a sheet and an amorphous sheet was prepared by the electrostatic pinning cooling method.

The resultant amorphous sheet was firstly 2.4 times stretched at 84° C. in a longitudinal direction, and then 1.25 times at 95° C. in the same direction. Then, the sheet was 3.9 times stretched at 120° C. in a transverse direction and fixed at 219° C. to prepare a film having a thickness of 15 μm (Comparative Example 1).

A film was prepared in the same manner as in Comparative Example 1, except that the raw materials (A), (D) and (F) were mixed so that an amount of the fine silica particles was 0.3% by weight and an amount of the synthetic calcium carbonate particles was 150 ppm (Comparative Example 2).

A film having a thickness of 15 μm was prepared in the same manner as in Comparative Example 1, except that the raw materials (B), (E) and(F) were mixed so that an amount of the ion exchange resin particles was 0.08% by weight and an amount of the synthetic calcium carbonate particles was 60 ppm (Comparative Example 3).

COMPARATIVE EXAMPLE 4

A raw material (G) containing spherical silica particles with an average particle size of 0.27 μm in an amount of 2.0% by weight was prepared in the same manner as in Comparative Example 1. The composition of Comparative Example 2 was used as the polyester (A), and the raw material (G) was used as the polyester (B). After drying, each of the raw materials was molten at 287° C. in different extruders, flowed together in a pipe and quenched to prepare an unstretched film. The unstretched film was used to form a film having a thickness of 15 μm in the same manner as in Comparative Examples 1 to 3. A-thickness of the layer (B) in the resultant film was 0.15 μm.

EXAMPLES 1 AND 2

A copolymeric polyester in which the dicarboxylic acid component consists of 80% by mole of a terephthalic acid units and 20% by mole of isophthalic acid units and the diol component consists of 98% by mole of ethylene glycol units and 2% by mole of diethylene glycol units, which contains the same spherical silica particles as used in Comparative Example 4 and which has an intrinsic viscosity of 0.68 was used as the raw material for the polyester layer (B).

Films each having a thickness of 15 μm and prepared in the same manner as in Comparative Example 4 from polyester having the same particle composition as in Comparative Examples 2 and 3 were used as the polyester layer (A) in Example 1 and 2, respectively.

The results are shown in the Table.

has an exposed surface with a degree of planar orientation of not larger than 0.100.

2. The polyester film according to claim 1, wherein the polyester (A) forming one of the exposed surfaces of the film is a polymer prepared through a polycondensation reaction of an aromatic dicarboxylic acid with an aliphatic glycol.

3. The polyester film according to claim 2, wherein the polyester (A) is one selected from the group consisting of polyethylene terephthalate (PET) and polyethylene-2,6-naphthalene dicarboxylate (PEN).

4. The polyester film according to claim 2, wherein the polyester (B) is a copolymeric polyester which is a copolymerization product of a base polyester component unit used in the polyester (A) with at least one other component.

5. The polyester film according to claim 4, wherein a total amount of a content in mole % of the copolymerizable component other than the main component of the polyester (A) in the total amount of carboxylic acids in the polyester layer (B) and a content in mole % of the copolymerizable component other than the main component of the polyester (A) in the total amount of diol components in the polyester layer (B) is from 6 to 40% by mole.

6. The polyester film according to claim 1, wherein the layer (A) contains inert particles having an average particle size of from 0.007 to 2.0 μm in an amount of 0.001 to 0.50% by weight.

7. The polyester film according to claim 1, wherein the layer (B) contains inert particles having an average particle size of 0.007 to 10 μm in an amount of not larger than 20% by weight.

8. A laminated polyester film according to claim 7,

TABLE

| Example No. | Com. 1 | Com. 2 | Com. 3 | Com. 4 | 1 | 2 |
|---|---|---|---|---|---|---|
| Properties of base film | | | | | | |
| Layer (A) | | | | | | |
| $Ra^A$ (μm) | 0.020 | 0.010 | 0.008 | 0.008 | 0.010 | 0.008 |
| Layer (B) | | | | | | |
| ΔP | 0.163 | 0.163 | 0.163 | 0.163 | 0.008 | 0.008 |
| Average particle size of particles 1 (μm) | 0.05 | — | — | — | — | — |
| Amount of particles 1 (wt %) | 0.35 | 0 | 0 | 0 | 0 | 0 |
| Average particle size of particles 2 (μm) | 0.7 | 0.12/0.7*[1] | 0.4/0.8*[2] | 0.27 | 0.27 | 0.27 |
| Amount of particles 2 (wt %) | 0.3 | 0.3/0.015*[1] | 0.08/0.006*[2] | 2.0 | 2.0 | 2.0 |
| t/d | — | — | — | 0.54 | 0.54 | 0.54 |
| Amount of white powder | Good | Fair | Bad | Bad | Good | Good |
| Contamination in calender | Good | Bad | Bad | Bad | Good | Good |
| Slipperiness | Good | Fair | Bad | Good | Good | Good |
| Properties of magnetic tape | | | | | | |
| Electromagnetic conversion property | Fair | Good | Very Good | Very Good | Good | Very Good |
| The number of dropouts | Good | Bad | Bad | Bad | Good | Good |
| Traveling property | Good | Fair | Bad | Good | Good | Good |

(Note)
*[1]Fine silica particles/synthetic calcium carbonate particles
*[2]Ion exchange resin particles/synthetic calcium carbonate particles

What is claimed is:

1. A polyester film suitable for a magnetic tape and prepared through a lamination of at least two layers by coextrusion, comprising:
   a layer of a polyester (A) with an exposed surface having a center line average roughness of from 0.002 to 0.015 μm,
   a layer of a polyester (B) laminated to polyester (A), polyester (B) having a lower melting point than polyester (A), wherein the layer of polyester (B) wherein the layer of polyester (B) contains inert particles having an average size of 0.1 to 0.5 μm.

9. A laminated polyester film according to claim 8, wherein the inert particles are contained in the layer of polyester (B) in an amount of 1.0 to 5.0% by weight.

10. A laminated polyester film according to claim 8, wherein the ratio of the thickness of the layer of polyester (B) to the average size of the inert particles is between 0.1 and 10.

11. A laminated polyester film according to claim 8, wherein the ratio of the thickness of the layer of polyester (B) to the average size of the inert particles is between 0.3 and 1.0.

12. A laminated polyester film according to claim 8, wherein the layer of polyester (B) has planar orientation not greater than 0.05.

13. A laminated polyester film according to claim 8, wherein the layer of polyester (B) has planar orientation not greater than 0.03.

14. A magnetic recording tape comprising a magnetic layer and a base film which is the polyester film according to claim 1.

15. A laminated polyester film according to claim 1, wherein the ratio of ten-point average roughness to center line average roughness of polyester (B) is not larger than 15.0.

16. A laminated polyester film according to claim 1, wherein the ratio of ten-point average roughness to center line average roughness of polyester (B) is not larger than 10.0.

17. A laminated polyester film according to claim 1, wherein the center line average roughness of the exposed surface of the layer of polyester (A) is from 0.003 to 0.011 μm.

18. A laminated polyester film according to claim 1, wherein the center line average roughness of the exposed surface of the layer of polyester (A) is from 0,004 to 0,009 μm.

* * * * *

UNITED STATES PATENT AND TRADEMARK OFFICE
CERTIFICATE OF CORRECTION

PATENT NO. : 5,366,783
DATED : November 22, 1994
INVENTOR(S) : UTSUMI et al

It is certified that error appears in the above-indentified patent and that said Letters Patent is hereby corrected as shown below:

On the title page: Item [19] delete "*Nov. 22, 1994" and insert -- Nov. 22, 1994 --.

Column 1, delete the following:

"[*] Notice: The portion of the term of this patent subsequent to Mar. 5, 2009 has been disclaimed".

Signed and Sealed this

Twenty-seventh Day of June, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.   : 5,366,783
DATED        : November 22, 1994
INVENTOR(S)  : Shigeo UTSUMI et al.

It is certified that error appears in the above-indentified patent and that said Letters Patent is hereby corrected as shown below:

On the title page, item [*] Notice:
entire section should be deleted.

Signed and Sealed this

Sixth Day of August, 1996

Attest:

BRUCE LEHMAN

Attesting Officer

Commissioner of Patents and Trademarks